United States Patent [19]
Kaiser

[11] Patent Number: 5,450,086
[45] Date of Patent: Sep. 12, 1995

[54] SELF-TUNING RECEIVER/DECODER FOR FREQUENCY SHIFT KEYING RF DATA TRANSMISSION

[75] Inventor: Ulrich Kaiser, Warstein, Germany

[73] Assignee: Texas Instruments Deutschland GmbH, Freising, Germany

[21] Appl. No.: 162,518

[22] Filed: Dec. 3, 1993

[51] Int. Cl.⁶ .............................................. G01S 13/80
[52] U.S. Cl. .......................................... 342/42; 342/51
[58] Field of Search .............................. 342/42, 51, 44

[56] References Cited

U.S. PATENT DOCUMENTS

| | | | |
|---|---|---|---|
| 5,053,774 | 10/1991 | Schuermann et al. | 342/44 |
| 5,347,280 | 9/1994 | Schuermann | 342/42 |
| 5,374,930 | 12/1994 | Schuermann | 342/42 |

*Primary Examiner*—Daniel T. Pihulic
*Attorney, Agent, or Firm*—James C. Kesterson; Richard L. Donaldson

[57] ABSTRACT

A self-tuning receiver/decoder for reception of FSK data transmission. An RF stage with resonant circuit (10) is tuned to a first of four possible transmitted frequencies for reception of such frequencies according to interrogation at such frequencies in sequence. Threshold (18) and counter circuits (12, 16) detect each frequency shift change of transmitted frequency and accordingly retune the resonant circuit to a subsequent unknown frequency by counting through a predetermined sequence for possible reception of each of such frequencies. Provision (24) is made for latching frequency shift data bit signals accordingly as output in a format identical to the frequency shift-keying RF format received. The receiver/decoder is especially useful for miniaturized transponder operation in which it alternates between receiving and transmitting modes, and is powered by capacitively stored charge in response to continuous transmission of the first frequency over a period.

16 Claims, 1 Drawing Sheet

| 1 | 2 | 3 | 4 | 5 |
|---|---|---|---|---|
| NUMBER OF FREQUENCIES | NUMBER OF POSSIBLE STATES | INTEGER NUMBER OF DATA BITS | DATA SPEED | CODING/ DECODING COMPLEXITY |
| 2 | 4 | 2 | 1.00 | LOW |
| 3 | 27 | 4 | 1.33 | HIGH |
| 4 | 256 | 8 | 2.00 | LOW |
| 5 | 3125 | 11 | 2.20 | HIGH |
| 6 | 46656 | 15 | 2.50 | HIGH |
| 7 | 823543 | 19 | 2.71 | HIGH |
| 8 | 16777216 | 24 | 3.00 | LOW |

SELF-TUNING RECEIVER/DECODER FOR FREQUENCY SHIFT KEYING RF DATA TRANSMISSION

BACKGROUND OF THE INVENTION

1. Field of the Invention

The invention relates to a receiver/decoder for the reception of digital data transmitted by an RF carrier signal using a modulation technique known as frequency shift keying, referred to in this disclosure as FSK. More particularly it relates to such a receiver/decoder which can function as the transmitting source for an FSK modulated signal in a format identical to that received.

2. Background of the Invention

In a system using a known FSK receiver/decoder, referred to herein as the known FSK receiver, two appropriately separated frequencies $f_1$ and $f_2$ are used to transmit information by FSK.

In such system using the known FSK receiver, digital information can be transmitted by designating frequency $f_1$ as the presence of data bit 1, and $f_2$ as the presence of data bit 0. A continuous digital data stream can be transmitted by changing between the frequencies $f_1$ and $f_2$ during regular, predetermined sampling intervals known as time slots.

The known FSK receiver senses the presence of frequencies $f_1$ and $f_2$ in successive time slots and appropriately assigns data values of one or zero according to the received frequency. The digital data stream thus received can be assembled into data blocks for storage, processing and/or later retrieval.

A disadvantage of this method of data modulation and transmission is that all possible combinations, i.e., each of multiple possible states, of frequencies $f_1$ and $f_2$ occur in the digital sequences 01, 00, 10, and 11. The data speed or rate, defined as the ratio of the number of transmitted frequencies to the number of data bits transmitted, is therefore unity, since only two frequencies are used to signal the data bits 1 and 0. In known FSK signal transmitters and receivers, this disadvantage may be overcome by transmitting frequencies $f_1$ and $f_2$ in the microwave range. By using extremely short duration time slots, and high transmitter frequencies, high transmitted data rates can be achieved.

Such technique is not advantageously employed where the system, for other reasons, is constrained to much lower transmitter frequencies, such as in the VLF frequency region, for the purpose of minimizing transmitter directional effects and to achieve extreme economy in the outlay and power use of decoding circuitry.

Accordingly, among the several objects of the present invention are to provide an FSK receiver/decoder which is capable of the highest possible data rates in applications where transmitter frequencies are constrained to much lower values than the microwave range, e.g., in the VLF region; which is useful in a system in which transmitter frequencies are relatively low for the purpose of minimizing transmitter directional effects; and which provides highest possible data rates while achieving extreme economy in outlay and power use.

A further object of the invention is to provide such an FSK receiver/decoder which permits it to be easily reconfigured as a transponder for operation in a mode in which data can be generated for retransmission in a format identical to that received.

It is also an object of the invention to provide such an FSK receiver/decoder which is operable at relatively low frequencies while employing more than two multiple transmitted frequencies, viz., preferably four discrete frequencies, each coded to two bits over four time slots, whereby to double the data speed over that of known two-frequency systems with two time slots; and which advantageously minimizes and simplifies the encoding circuitry when the receiver/decoder operates in the transponder mode.

It is also an object of the invention to provide an FSK receiver/decoder capable of for overcoming a temporary loss or fade of receive input signal strength resulting from environmental conditions.

A further object of the invention is to provide such an FSK receiver/decoder of high efficacy in a system.

SUMMARY OF THE INVENTION

Briefly, there is described a self-tuning receiver/decoder for reception of frequency shift keying (FSK) data transmission. A radio frequency (RF) stage with resonant circuit is tuned to the frequency shift-keying RF data transmission, including a radio frequency stage comprising resonant circuit means for being tuned to a first frequency of a plurality of more than two other frequencies, preferably four such frequencies, for reception according to interrogation at such frequencies in sequence. Means is provided for detecting each frequency shift change of such interrogation frequency to a subsequent one of the other frequencies. The receiver/decoder includes means for retuning the resonant circuit for reception of each of such other frequencies whereby to generate frequency shift data bit signals in a format identical to a frequency shift-keying RF format received.

Fundamentally, a FSK receiver/decoder of this invention utilizes four transmitted frequencies each identified by two binary digits across a span of four time slots. By increasing the number of frequencies in an FSK modulation system, the number of recoverable data bits encoded over a given span of time slots is also increased. The data rate of a system employing such a four-frequency FSK receiver/decoder, being defined by eight bits total for four frequencies, is accordingly double that of known two-frequency FSK systems.

DESCRIPTION OF THE PREFERRED EMBODIMENT

Figures 1, 2:
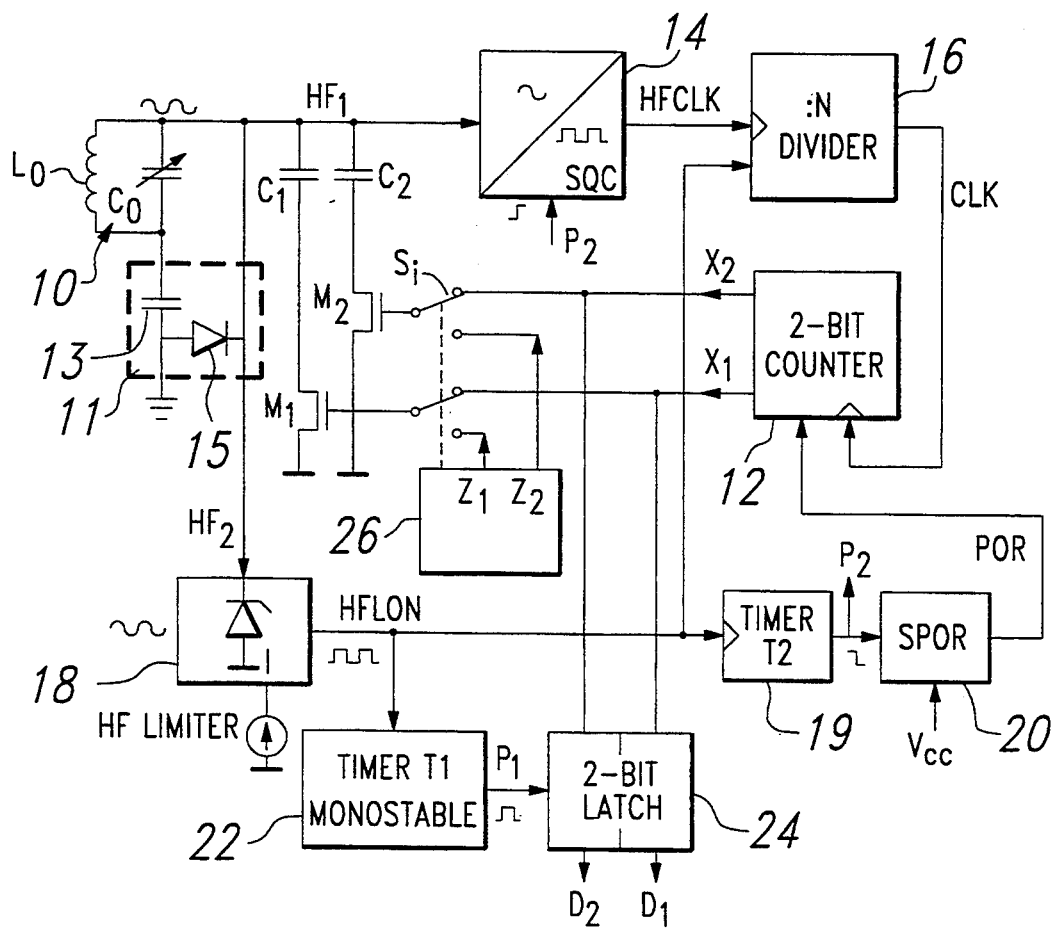
FIG. 1 is a data table based on equation (1) showing a range of keying frequencies with possible states, the number of recoverable data bits as determined by equation (1), the so denominated data speed defined as the ratio of the number of keying frequencies to data bits, and an assessment of coding/decoding circuit complexity.
FIG. 2 shows exemplary embodiments of a Self-Tuning receiver/decoder for four frequency-shift RF data transmission, in accordance with the present invention.

Referring now to the drawings and initially to FIG. 1, the invention will be described according to a preferred embodiment.

The theoretical relationship between the number of frequencies, NF, and the possible number of data bits in NF time slots is given by a known theorem in FSK modulation theory which is stated as follows:

$$X_d = \text{INT} (NF \ln NF/\ln 2) \quad (1)$$

where NF is the number of frequencies and time slots, $X_d$ is the number of data bits, lnNF is the natural logarithm of NF and ln2 is the natural logarithm of 2, the term INT rounds the results of the calculation to the next lowest integer value of $X_d$.

Thus, in FIG. 1, column 1 shows a range of possible keying frequencies from 2 to 8. Column 2 shows the number of possible states or combinations associated with a given number of keying frequencies. The relationship between column 1 and column 2 is exponential. That is, in the case of two frequencies, the number of possible states is given by 2exp2 (4), for three frequencies 3exp3 (27), and for four frequencies 4exp4 (256). As the number of frequencies increases, so also the complexity of frequency generation and separation circuitry increases.

Column 3 of this first FIGURE shows the number of recoverable data bits in relation to the number time slots and frequencies keyed. The data bits number is calculated from equation (1) using equal numbers for time slots and frequencies.

In column 4, a so-called data speed is shown. It is not the same as data rate but rather is herein defined and intended to represent a measure of signal encoding/decoding efficiency. The form is analogous to the "speed" of a camera lens. This column shows that data speed increases with number of frequencies, but much more slowly than with the number of frequency states.

Column 5 of FIG. 1 is a qualitative assessment of the degree of difficulty and/or complexity associated with decoding data bits. The invention advantageously embodies the case of four frequencies coded with two binary digits and sensed in four successive time slots. This case optimizes the combination of the factors of data speed, ease of generating and separating transmitter frequencies, and complexity and outlay in decoding circuitry and components.

FIG. 2 shows an exemplary embodiment of a self-tuning receiver/decoder of the present disclosure includes a resonant circuit 10. At receiver start-up, resonant circuit 10 having an inductance $L_0$ and parallel capacitance $C_0$ is tuned to the highest frequency $f_0$ of four frequencies $f_0$, $f_1$, $f_2$, $f_3$ having the relationship $f_0 > f_1 > f_2 > f_3$. Such resonant circuit may variously comprise elements $L_0 C_0 C_1 C_2$ according to the one of such frequencies as may be received or transmitted, according to the operation of MOSFET (metal oxide semiconductor field effect transistor) switches $M_1$ and $M_2$ by switching of capacitors $C_1$ and $C_2$ combinatively in or out of the resonant circuit in manner explained below.

The receiver/decoder is powered by a separate transmitter of the system such as a reader or interrogator transmitting a signal at the highest frequency of the transmitted signal range for some fixed period of time in accordance with methodology and implementation of such methodology described in Schuermann U.S. Pat. No. 5,053,774, herein incorporated by reference. In accordance with such disclosure, the power source 11 for the inventive receiver/decoder is a capacitor 13 which is charged by means of diode 15 any time $V_{cc}$ is greater than zero ($V_{cc} > 0$) and $HF_1$ is less than zero ($HF_1 < 0$) since $C_L$ is significantly greater than $C_0$ (i.e., $C_L >> C_0$), for AC currents, the tank circuit $L_0/C_0$ is effectively connected to ground through $C_L$. That is, $C_L$ provides substantially an AC short between $V_{cc}$ and ground. According to one embodiment, the charge up of $C_L$ is accomplished by the continuous transmission of the highest signal frequency for some fixed period of time. That is, the transmitter sustains transmission of this frequency for some period of time to provide receiver power.

During receiver power-up by using such technique according to U.S. Pat. No. 5,053,774, a 2-bit counter 12 is reset to $X_1 = X_2 = 0$. A received sinusoidal signal now appearing across resonant circuit 10 in response to such transmission follows two paths. One path $HF_1$ enters a sine-to-square wave converter 14, the output of which, at the received signal frequency enters a divider 16, i.e., a divide-by-N counter. The rate N is established according to rationale set forth hereinbelow. The divider output is a source of clock signals for the 2-bit counter 12. Thus counter 12 will, when enabled, count at the rate of $f_n/N$, where $f_n$ is the received one of frequencies $f_0$, $f_1$, $f_2$, $f_3$.

The second signal path $HF_2$ enters a high frequency clipper/limiter 18, serving as threshold detector means, generating a pulse train HFLON if and only if, the sine wave signal input level exceeds a predetermined threshold.

Pulse train HFLON is also an input to the divider 16, where its presence resets and inhibits the divider. The HFLON pulse train performs two other functions. One function is to initiate a timing circuit 19, referred to herein as timer $T_2$, one output, $P_2$, of which immediately activates the sine-to-square wave converter 14, and a second output, POR, conditioned by a power loss detector 20, at a later time, resets the counter 12 to an all-zero condition. A second function of pulse train HFLON is to trigger a monostable circuit 22, the output of which is a single pulse $P_1$ which appears only after a brief interruption of HFLON. This pulse is used to transfer and hold bits $X_1$ and $X_2$ derived from counter 12. The counter bits $X_1$ and $X_2$ thus appear as data bits $D_1$ and $D_2$ on the outputs of a 2-bit data latch 24 for further use in accordance with said U.S. Pat. No. 5,053,774. Latch 24 is provided with the output $P_1$ for reset purposes upon the appearance of HFLON.

Thus, it will be apparent that operation of the receiver/decoder is as follows:

After startup, the receiver/decoder is tuned to and (in accordance with the technique evident from U.S. Pat. No. 5,053,774) is powered by received frequency $f_0$ during a transponder cycle in a first portion of which the receiver/decoder receives RF energy from a separate transmitter. The pulse train HFLON is present due to a sufficiently high signal strength at clipper/limiter 18. The inhibiting presence of HFLON at the divider disables the clock pulse train CLK, and the output $X_1$ and $X_2$ of counter 12 are both in the initialized zero state.

When the transmitter changes to another frequency, the value of which from among the possible such frequencies $f_0$, $f_1$, $f_2$, $f_3$ is not known at the site of the receiver/decoder, the receiver/decoder is, of course, detuned from its preset initial condition, and received signal strength accordingly falls. If the signal strength falls below the threshold set by limiter 18, indicating a possible new transmitter frequency, the HFLON pulse train disappears, divider 16 becomes active, and clock signals from 14 thus advance the state of counter 12.

The changing data bits $X_1$ and $X_2$ of counter 12 switch tuning capacitors $C_1$ and $C_2$, singly or in combination, in parallel with tuning inductor $L_0$ and capacitor $C_0$ to alter the resonant frequency of resonant circuit 10 until the receiver is retuned and the pulse train HFLON reappears.

The reappearance of HFLON immediately inhibits divide-by-N operation of divider 16, thus arresting the 2-bit counter 12. The now static output $X_1$ and $X_2$ of counter 12 is the identifier for the frequency just received, and a pulse from monostable circuit 22 transfers $X_1$ and $X_2$ to output latch 24 as two bit data $D_1$, $D_2$ advantageously, no special decoding circuitry being thus otherwise required.

Accordingly, it is now apparent that counters 12, 16 together with limiter/clipper 18 serves as means for determining and identifying which of the multiple frequencies is being received, by detection of the transmission of each such frequency in sequence and altering accordingly the tuned frequency.

In such manner, the receiver/decoder responds to further frequency change advantageously by cyclic and unidirectional advancement of counter 2 through codes representing specific transmitter frequency changes according to the sequence . . . $f_2$, $f_3$, $f_0$, $f_1$,$f_2$, $f_3$, $f_0$, $f_1$ . . ., arresting counter 12 and transferring data bits $X_1$ and $X_2$ when the appropriate receiver retuning operations are completed for each such frequency in the sequence.

An embodiment of the invention also includes provision for overcoming a temporary loss or fade of input signal strength to the receiver due to environmental conditions, as well for initializing the new receiver/decoder for detection of frequencies in sequence. Such a capability is demonstrated as follows.

Should such a fade of received signal occur, the T2 interval provided by timing circuit 19, being triggered continuously by the presence of pulse train HFLON, times out or expires if signal loss longer than time T2 occurs. Expiration of timer T2 interval generates signal POR which disables sine wave-to-square wave converter 4, and resets counter 12 outputs $X_1$ and $X_2$ to zero, thus re-initializing the receiver/decoder to await the return of adequate transmitted signal strength.

The new receiver/decoder when thus reinitialized in this manner will be tuned anew for initial reception of the highest frequency $f_0$ of four frequencies $f_0$, $f_1$, $f_2$, $f_3$.

Another aspect of an FSK receive capability of the invention is the provision of switch S1 which may be of circuit controlled semiconductor type known to those skilled in the art of the present development for serving as means for permitting selective external control of the pair of MOSFET transistors serving as switches $M_1$ and $M_2$ for control of capacitors $C_1$ and $C_2$.

In a receiving mode these transistors $M_1$ and $M_2$ are switched by control bits $X_1$ and $X_2$, but otherwise may be so switched for transponder mode operation by transmit-mode switching control means 26 which controls switch S1 in accordance with said U.S. Pat. No. 5,053,774 (but not otherwise forming part of this disclosure) via signal paths $Z_1$ and $Z_2$ for switching $M_1$ and $M_2$ and thereby switching the capacitors $C_1$ and $C_2$ in or out the resonant circuit retuning during transmission as well as reception. Such resonant circuit may therefore serve as a resonant transmission circuit 10, its frequency modified by selective combination of originating sequences of RF signals in the identical format to that received, for purposes of signal retransmission.

Accordingly the new receiver/decoder includes provision for serving as a transponder for operation as a transceiver by alternating between receiving and transmitting modes in accordance with said U.S. Pat. No. 5,053,774.

It is to be recognized from the foregoing that there has thus been attained a self-tuning receiver/decoder for the reception of frequency shift-keying RF data transmission which effectively includes means for reconfiguring the radio frequency stage of the receiver/decoder to generate RF keying signals in a format identical to that received.

The receiver/decoder is amenable to an implementation in which it needs no extrinsic, separate power source, since its power source is a capacitance charged by the continuous transmission of the highest signal frequency for some fixed period of time.

Operation and features may be summarized accordingly as follow:

The receiver/decoder includes circuits effectively permitting automatic retuning to receive one of four possible transmitted frequencies by means of capacitors $C_1$ and $C_2$ which are switchable either individually or in combination, in parallel with inductor $L_0$ and capacitor $C_o$ to provide resonance at the highest single frequency RF signal transmitted.

The search for a retuned transmitted signal is effected by a pulse train derived from a digital divider 16 which is driven by, via sine-to-square wave converter 14, with a digitized form of the received signal, such pulse train advancing the state of 2-bit digital counter 12, outputs of which successively switching first one capacitor, then a second capacitor and finally both of such capacitors $C_1$ and $C_2$ in parallel with the receiver baseband tuned circuit 10, said switching operation changing the resonant frequency of the said baseband tuned circuit 10 until the said changed resonant frequency increases the received signal strength. The increased signal strength is tested against a reference by predetermined threshold circuit 18, which circuit issues an arresting signal pulse which stops 2-bit counter 12 at the control state corresponding to the capacitor combination thus causing resonance of the receiver tuned circuit 10 at the new, previously unknown transmitted frequency.

Reappearance and threshold testing of the increased strength signal also causes the issuance of a second pulse which transfers the state of 2-bit counter 12 to a storage circuit constituted by 2-bit latch 24 and holds the said state for access for further storage and processing purposes.

Thus also, the delay or absence of the said increased signal strength for a predetermined time switches off all receiver functions and re-initializes the receiver/decoder to initialized conditions ready to accept a continuous transmission at the designated highest frequency for power storage purposes.

The identification of a total of four frequencies is effected by advancing 2-bit counter 12 through each of a plurality of possible digital states.

By selectively changing N, the ratio of divider 16 as driven by the RF signal-derived digitized pulse train may be advantageously varied according to desired optimization to lengthen or shorten the time intervals over which the 2-bit counter may change state.

So also, the values of the said two capacitors $C_1$ and $C_2$, and the time of issuance of the data transfer pulse referred to above may be advantageously changed for the purposes of receiver performance optimization.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

Similarly, reference numerals or representative parameters in the claims are intended to be illustrative rather than limiting.

What is claimed is:

1. A self-tuning receiver/decoder for reception of frequency shift-keying RF data transmission, including a radio frequency stage comprising resonant circuit means for being tuned to a first frequency of a plurality of more than two frequencies for reception of such frequencies according to interrogation at such frequencies in sequence, means for detecting each frequency shift change of such interrogation frequency to a subsequent one of the other frequencies, and means for retuning the resonant circuit for reception of each of such other frequencies whereby to generate frequency shift data bit signals in a format identical to a frequency shift-keying RF format received.

2. A self-tuning receiver/decoder according to claim 1 wherein the means for detecting each frequency shift change of such interrogation frequency to a subsequent one of multiple other frequencies comprises threshold detecting means for determining if received signal strength falls below a predetermined threshold for providing indication of a possible new transmitter frequency.

3. A self-tuning receiver/decoder according to claim 2 wherein the threshold detecting means is a limiter/clipper circuit for receiving signals from the resonant circuit for providing an output signal.

4. A self-tuning receiver/decoder according to claim 1 wherein the means for retuning the resonant circuit comprises counter circuitry for counting through a sequence representing a plurality of more than two transmitter frequency changes in a sequence corresponding to the frequency shift-keying RF format received.

5. A self-tuning receiver/decoder according to claim 1 wherein the resonant circuit is successively tunable to each of a plurality of four frequencies according to a predetermined sequence.

6. A self-tuning receiver/decoder according to claim 5 wherein four frequencies may be represented as $f_0, f_1, f_2, f_3$ having the relationship $f_0 > f_1 > f_2 > f_3$ and the predetermined sequence may be represented accordingly by the typical sequence . . . $f_2, f_3, f_0, f_1, f_2, f_3, f_0, f_1$ . . . .

7. A self-tuning receiver/decoder according to claim 4 wherein the counter means comprises a 2-bit counter which is operative for counting through a sequence corresponding to a predetermined sequence of four frequencies $f_0, f_1, f_2, f_3$ having the relationship $f_0 > f_1 > f_2 > f_3$, the means for detecting a each frequency shift change arresting counting of the 2-bit counter and for causing transferring of a pair of data bits upon retuning of the resonant circuit for each received such frequency, and for thereafter reinitiating counting of the 2-bit counter upon the resonant circuit not receiving such frequency.

8. A self-tuning receiver/decoder according to claim 7 wherein the counter means comprises a divide-by-N counter for dividing the received frequency $f_n$ by a factor N for providing count pulses for counting by the 2-bit counter when enabled at a rate $f_n/N$.

9. A self-tuning receiver/decoder according to claim 8 further comprising a sine-to-square wave converter for providing signals received by the resonant circuit to the divide-by-N counter.

10. A self-tuning receiver/decoder according to claim 7 further comprising signal power loss detector and time delay means for resetting the 2-bit counter to an all-zero condition for initializing the receiver/decoder after a predetermined interval following loss of received signal.

11. A self-tuning receiver/decoder according to claim 1 wherein the receiver/decoder is powered by capacitively stored charge in response to continuous transmission of a selected one of said frequencies for some fixed period of time.

12. A self-tuning receiver/decoder according to claim 10 wherein the selected one of said frequencies is the highest $f_0$ of four frequencies which may be represented as $f_0, f_1, f_2, f_3$ having the relationship $f_0 > f_1 > f_2 > f_3$, and the resonant circuit is initially tuned for resonance at the highest frequency $f_0$.

13. A self-tuning receiver/decoder according to claim 11 wherein the means for retuning the resonant circuit for reception of each of such other frequencies comprises multiple additional capacitance, and semiconductor switch means for selectively switching the additional capacitance combinatively in or out of the resonant circuit for retuning thereof in accordance with a predetermined data sequence.

14. A self-tuning receiver/decoder according to claim 13 wherein the semiconductor switch means is selectively responsive to the counter circuitry during a receive mode of the receiver/decoder and to transmit-mode switching control means during a transmit mode thereof.

15. A self-tuning receiver/decoder according to claim 12 further comprising latch means for providing the predetermined data sequence as an output of the receiver/decoder for representing said frequency shift data bit signals.

16. A self-tuning receiver/decoder according to claim 14 further comprising a 2-bit counter which is operative for counting through a sequence corresponding to the predetermined sequence of said frequencies, the semiconductor switch means comprise MOSFET devices for selectively switching in and out of the resonant circuit respective additional capitances for retuning of the resonant circuit to different ones of said frequencies in response to the 2-bit counter, counting of the 2-bit counter being arrested on tuning of the resonant circuit to a different received one of said frequencies and for causing transferring of a pair of data bits upon retuning of the resonant circuit for each received such frequency, and for thereafter reinitiating counting of the 2-bit counter upon the resonant circuit not receiving such frequency.

* * * * *